R. L. DEZENDORF.
GAS METER.
APPLICATION FILED MAY 17, 1913. RENEWED SEPT. 5, 1917.
1,262,929.   Patented Apr. 16, 1918.
3 SHEETS—SHEET 1.
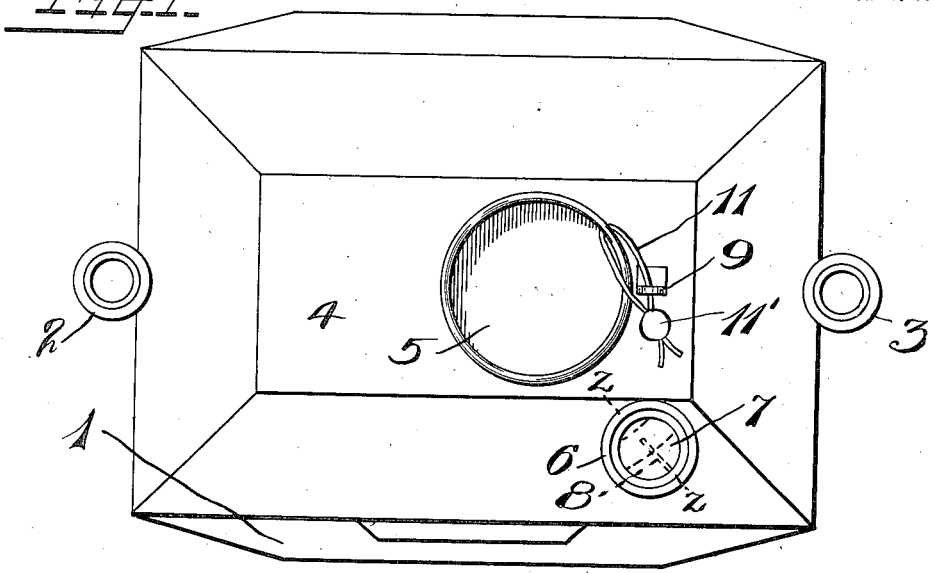
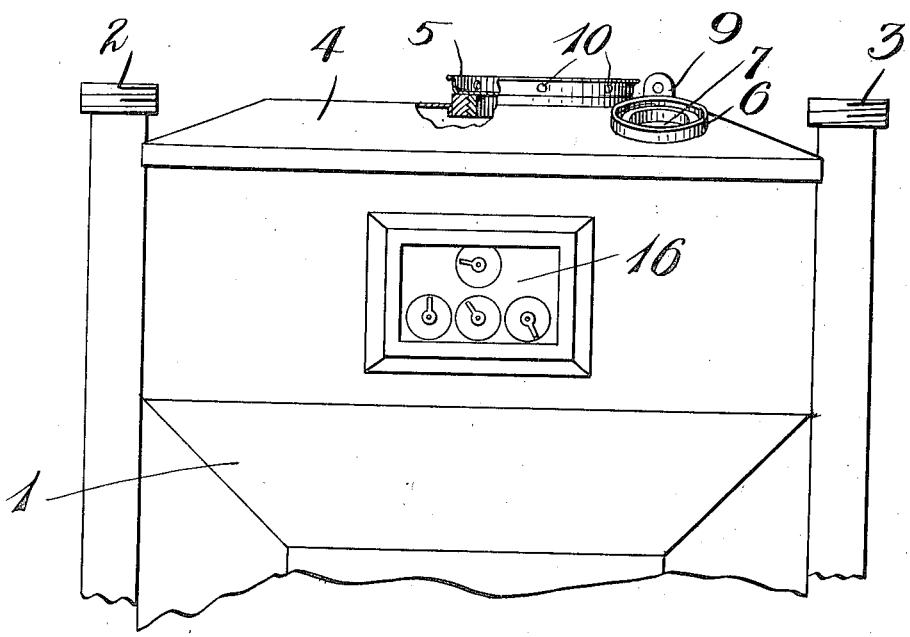
Witnesses:
Chas. A. Beard
Lillian S. James
Inventor
R. L. DEZENDORF
By his Attorneys

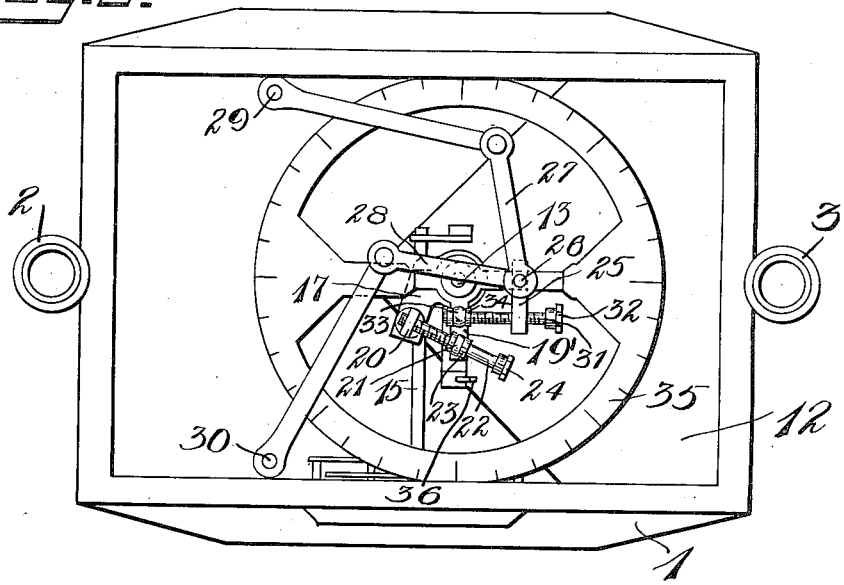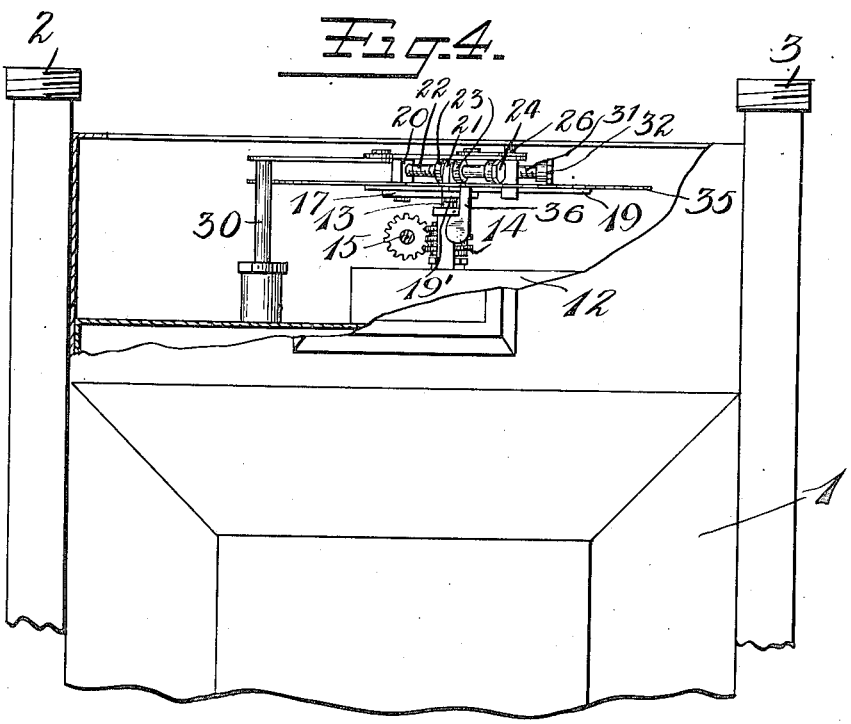

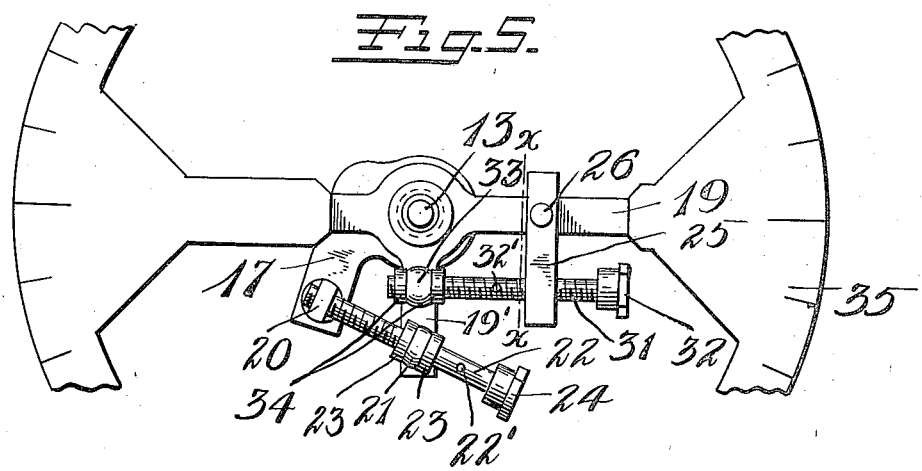

UNITED STATES PATENT OFFICE.

RICHARD L. DEZENDORF, OF RICHMOND HILL, NEW YORK.

GAS-METER.

1,262,929.  Specification of Letters Patent.  Patented Apr. 16, 1918.

Application filed May 17, 1913, Serial No. 768,240. Renewed September 5, 1917. Serial No. 189,884.

*To all whom it may concern:*

Be it known that I, RICHARD L. DEZENDORF, a citizen of the United States, residing at Richmond Hill, Queens county, New York, have invented certain new and useful Improvements in Gas-Meters, of which the following is a full, clear, and exact description.

My invention relates to improvements in gas meters, and has for its object to provide a meter which can be tested and adjusted without disconnecting it from the mains or removing it from the place in which it is installed, with the result that each meter can be tested and adjusted under the conditions to which that particular meter is normally subject.

The following is a description of a meter embodying my invention, reference being had to the accompanying drawings, in which, Figure 1 is a plan view of a meter embodying my invention;

Fig. 2 is a front elevation of the upper portion thereof;

Fig. 3 is a plan view of the same, with the cover of the meter removed;

Fig. 4 is a front elevation of the same, with the cover removed and a portion of the front wall of the meter case, including the registering mechanism, broken away;

Fig. 5 is an enlarged view of means for adjusting the tangent post radially and angularly with respect to the crank shaft;

Fig. 6 is a plan view and Fig. 6ᵃ is an end elevation of the tangent arm of the meter;

Fig. 7 is a section on the line x—x Fig. 5, showing the tangent arm and adjusting screw in section and also showing the movable tangent post mounted on the tangent arm and a portion of the indicator;

Fig. 8 is a plan view of the tangent anchor;

Fig. 9 shows a section of the tangent anchor on the line y—y Fig. 8;

Fig. 10 is a section on the line z—z Fig. 1, showing a peep hole and marker; and, Fig. 11 is a plan view of the peep hole and marker shown in Fig. 10.

Referring more particularly to the drawings, 1 is the ordinary meter casing having the inlet 2 and the outlet 3. 4 is the cover of the meter secured thereto in the ordinary way by solder. 5 is a removable screw-threaded closure for closing an opening in the cover of the meter. 6 is a bushing having a transparent closure 7 constituting a peep hole for observing the indicator hereinafter referred to. 8 is a marker supported from any convenient stationary surface, preferably from the bushing 6, and being in a position adjacent to the indicator. 9 is a perforated stud secured to the cover 4 adjacent to the closure 5. The closure 5 is provided with a series of perforations 10. 11 is a seal wire passed through one of the perforations 10 and through the perforation in the stud 9 and secured by a seal 11′ for sealing the closure 5 in place.

Referring to the parts beneath the cover 4, 12 is the ordinary valve casing, through which extends the crank shaft 13 carrying the ordinary worm gear 14 operating the shaft 15 of the indicating mechanism 16 in the ordinary manner. To the top of the crank shaft is rigidly secured a tangent anchor 17. This tangent anchor is provided with a stud 18 on which is mounted a tangent arm 19. The tangent arm 19 is mounted so as to be movable about the axis of the crank shaft to which the tangent anchor is rigidly secured. The tangent anchor is provided with a revoluble stud 20 having a screw-threaded opening. The tangent is provided with an offset 19′ and a revoluble stud 21, through which passes the shank of an adjusting screw 22. This adjusting screw is provided with abutments or stops 23 on each side of the stud 21, so as to hold it against longitudinal movement relatively thereto, and is provided with screw-threads which engage the screw-threads in the stud 20. It is also provided with an angular head 24 to which a suitable wrench can be applied.

25 is the base of a tangent post having a bearing pin 26 to which the flag arms 27—28, carried by the flag wires 29—30, are connected. The tangent post is provided with a screw-threaded hole through which an adjusting screw 31 passes, as shown in Figs. 3, 5 and 7. This adjusting screw is provided with an angular head 32 to fit a suitable wrench and at its other end passes through a stud 33 carried by an offset on the tangent arm 19. This end of the screw 31 is provided with stops 34—34 on each side of the stud 33, so as to prevent it from moving longitudinally relatively to the stud 33. The tangent arm carries a horizontal indicating circle 35 having graduations visible on its upper surface and lying beneath the marker 8, so that both the indicator 35 and the marker 8 are visible through the peep hole, as shown in Figs. 10 and 11. 36 is the ordinary pawl for preventing backward rotation of the meter.

It is to be noted that the heads 22 and 32 are located adjacent to the closure 5, so that when the closure 5 is removed they are easily accessible through the opening in the cover. By applying a suitable wrench to the head 32, the screw 31 can be moved in one direction or the other, and the tangent base 25, together with its pin 26, can thereby be moved toward or away from the axis of the crank shaft so as to be adjusted readily. The screws may also be provided with holes 22′ and 32′ in which a rod may be inserted for turning them.

The turning of the screw 22 in one direction or the other moves the tangent angularly in one direction or the other with reference to the crank shaft and the tangent anchorage 17 rigidly connected thereto. By these simple means, therefore, the tangent post of the meter can be adjusted both radially and angularly upon the removal of the closure 5 without disconnecting the meter from the mains or removing it from the place where it is installed. Before and after adjusting, the condition of the meter can be accurately observed by connecting a suitable testing apparatus to the outlet port thereof and observing the indication afforded by the indicator 35 through the transparent closure 7, the marker 8 constituting a stationary pointer to assist in the accurate reading of the indicator 35. The indicator 35 is rigidly connected to the tangent arm so that there is no lost motion between it and the crank shaft, and thereby gives a correct indication of the angular position of the crank shaft.

My improvement may be easily applied to old meters by substituting the tangent anchor 17 and the parts carried thereby for the old style of tangent, and providing the cover with a suitable closure and peep hole, as shown, without altering any other portion of the casing of the meter or the mechanism contained therein.

In using a meter embodying my invention, I first disconnect the outlet port from the house service, and connect thereto a suitable testing apparatus. I then test the meter, observing the indications afforded by the indicator 35 through the peep hole, and determine whether it is running fast or slow. If it is not running correctly, I then remove the closure 5 and operate either the screw 22 or the screw 31, or both of them, so as to adjust the tangent post into the proper position relative to the crank shaft, testing the meter after such adjustment to determine whether or not the adjustment has been correctly made. I then place the closure 5 in place, sealing it as shown. I preferably place a protecting plug in the peep hole as shown in dots in Fig. 10, so as to protect the transparent closure 7.

The screw 31 is located at one side of the tangent arm 19 parallel to the arm of the tangent which carries the tangent post, and being offset in this way, is accessible for adjusting the tangent post without removing the flag arms therefrom. The tangent post being partly carried by the tangent arm and partly by the screw 31, and having a large bearing surface on the tangent arm, is not liable to be thrown out of plumb when being adjusted toward or from the axis of the crank shaft.

My invention, as will be evident to those skilled in the art, permits of various modifications without departing from the spirit thereof or the scope of the appended claims. The form shown, however, is the form preferred by me.

What I claim is:

1. In a meter, the combination of a tangent arm, a tangent post carried thereby and longitudinally movable thereon, and means located at one side of said tangent arm and engaging said arm and post for adjusting said post in a radial direction upon said arm.

2. In a meter, the combination of a tangent arm, a tangent post carried thereby and longitudinally movable thereon, said tangent post having a pin for the flag arms of the meter, and an adjusting screw parallel to but out of alinement with the radius passing through the axis of said tangent arm and said pin on said tangent post, said screw engaging said tangent post and arm.

3. In a meter, the combination of a tangent arm, a tangent post carried thereby and longitudinally movable thereon, said tangent post having a pin for the flag arms of the meter, and an adjusting screw parallel to but out of alinement with the radius passing through the axis of said tangent arm and said pin on said tangent post, said screw engaging said tangent post and arm and held against longitudinal movement relative to one of said two last mentioned members.

4. In a meter, the combination of a crank shaft, a tangent arm mounted thereon so as to be adjustable angularly with reference thereto, a tangent post carried by said arm movable radially relative to the axis thereof, means for adjusting said arm angularly and means for adjusting said post radially, both said means being located on the same side of said arm.

5. In a meter, the combination of a crank shaft, an anchor rigidly secured thereto, a tangent arm adjacent to and carried by said anchor and movable relatively thereto about the axis of said crank shaft, said tangent arm having a tangent post supporting portion and an offset at an angle thereto, a longitudinally adjustable tangent post on said supporting portion, and adjusting screws engaging said anchor and tangent post respectively and also said offset.

6. In a meter, the combination of a crank shaft, an anchor rigidly secured thereto, a tangent arm adjacent to and carried by said anchor and movable relatively thereto about the axis of said crank shaft, said tangent arm having a tangent post supporting portion and an offset at an angle thereto, a longitudinally adjustable tangent post on said supporting portion, and adjusting screws engaging said anchor and tangent post respectively and also said offset, a cover for said meter having an opening and a closure therefor, said adjusting screws being accessible through said opening when the closure is removed.

7. In a meter, the combination of a tangent arm, a tangent post carried thereby and longitudinally movable thereon, means located at one side of said tangent arm, and engaging said arm and post for adjusting said post in a radial direction upon said arm, an indicator secured to said tangent arm and provided with graduation marks on its upper surface, and a stationary marker adjacent to said graduations.

8. In a meter, the combination of a tangent arm, a tangent post carried thereby and longitudinally movable thereon, means located at one side of said tangent arm and engaging said arm and post for adjusting said post in a radial direction upon said arm, an indicator secured to said tangent arm and provided with graduation marks on its upper surface, a stationary marker adjacent to said graduations, and a cover provided with a peep-hole through which the marker is visible.

RICHARD L. DEZENDORF.

Witnesses:
H. B. BROWNELL,
E. E. MORSE.